United States Patent
Maeda et al.

(10) Patent No.: US 8,321,185 B2
(45) Date of Patent: Nov. 27, 2012

(54) PROGRAM FOR OUTPUTTING STRESS-STRAIN EQUATION AND ITS DEVICE

(75) Inventors: Kazuhisa Maeda, Ibaraki (JP); Shigenobu Okazawa, Higashi-Hiroshima (JP); Koji Nishiguchi, Higashi-Hiroshima (JP)

(73) Assignees: Nitto Denko Corporation, Ibaraki-shi, Osaka (JP); Hiroshima University, Higashi-Hiroshima-shi (JP)

( * ) Notice: Subject to any disclaimer, the term of this patent is extended or adjusted under 35 U.S.C. 154(b) by 338 days.

(21) Appl. No.: 12/606,499

(22) Filed: Oct. 27, 2009

(65) Prior Publication Data

US 2010/0274538 A1    Oct. 28, 2010

(30) Foreign Application Priority Data

Apr. 28, 2009   (JP) ................................ 2009-109605

(51) Int. Cl.
*G06F 7/60* (2006.01)
*G06F 17/10* (2006.01)

(52) U.S. Cl. .......................................................... 703/2
(58) Field of Classification Search ........................ 703/2
See application file for complete search history.

(56) References Cited

U.S. PATENT DOCUMENTS

| | | | |
|---|---|---|---|
| 7,254,492 B2 * | 8/2007 | Miyamoto et al. | 702/44 |
| 7,415,398 B2 * | 8/2008 | Naito et al. | 703/6 |
| 7,762,048 B1 * | 7/2010 | LeCompte | 54/82 |
| 2004/0073385 A1 * | 4/2004 | Miyamoto et al. | 702/44 |
| 2004/0254745 A1 * | 12/2004 | Miyamoto et al. | 702/42 |
| 2005/0004779 A1 * | 1/2005 | Ueda et al. | 702/182 |
| 2005/0086034 A1 * | 4/2005 | Naito et al. | 703/2 |
| 2006/0106586 A1 * | 5/2006 | Naito | 703/2 |
| 2009/0119081 A1 * | 5/2009 | Yu | 703/9 |
| 2009/0162640 A1 * | 6/2009 | Schlenoff | 428/323 |
| 2011/0100746 A1 * | 5/2011 | Berker et al. | 181/286 |

FOREIGN PATENT DOCUMENTS

JP    2006-250811 A    9/2006

(Continued)

OTHER PUBLICATIONS

Fredrik Karlsson, "Modelling non-linear dynamics of rubber bushings—parameter identification and validation", Aug. 2003.*
David Roylance, "Engineering Viscoelasticity", Oct. 2001.*

(Continued)

*Primary Examiner* — David Silver
*Assistant Examiner* — Angel Calle
(74) *Attorney, Agent, or Firm* — Westerman, Hattori, Daniels & Adrian, LLP

(57) ABSTRACT

There is provided a model that can evaluate properties of viscoelasticity and also rubber elasticity of an elastic material. A correlation equation between stress and strain that is calculated from: a correlation equation between stress, strain, elastic modulus and relaxation time, calculated based on a Maxwell model in which an elastic element and a viscous element are placed in series; and a correlation equation between strain and elastic modulus, including different moduli depending on properties, the correlation equation between stress and strain including different moduli depending on said properties as parameters is output as a stress-strain curve formula. There is one feature in finding a correlation between the strain and the elastic modulus, and this allows a large deformation behavior of an elastic material having properties of both rubber elasticity and viscoelasticity to be expressed with high quantitative characteristics on simulation.

2 Claims, 7 Drawing Sheets

FOREIGN PATENT DOCUMENTS

JP        2007-101220 A      4/2007

OTHER PUBLICATIONS

Kazuhisa Maeda, "Deformation analysis of adhesive by eulerian method", May 2008.*

Japanese Office Action dated Jun. 24, 2011, issued in corresponding Japanese Patent Application No. 2009-109605.

Kazuhisa Maeda et al.; "Deformation Analysis of Adhesive by Eulerian Method"; Papers from the Computational Engineering Conference, Japan, The Japan Society for Computational Engineering and Science, May 19, 2008, vol. 13, 2nd issue, pp. 781-782.(w/partial English translation)(cited in Japanese Office Action dated Jun. 24, 2011).

* cited by examiner

PROGRAM FOR OUTPUTTING STRESS-STRAIN EQUATION AND ITS DEVICE

FIELD OF THE INVENTION

The present invention relates to a program for outputting a stress-strain curve formula that is required for representing a large deformation behavior of an elastic material having properties of both rubber elasticity and viscoelasticity with high quantitative characteristics on simulation, and an apparatus thereof.

RELATED ART

Viscoelasticity has conventionally been used as an indicator for evaluating a property of an elastic material, and a generalized Maxwell model, in which an elastic element and a viscous element are placed in series, has been used as a model for representing the viscoelasticity. In the generalized Maxwell model, an actual stress-time curve (stress relaxation curve) (see FIG. 1(a)), which is the viscoelasticity of the elastic material, can be expressed by a correlation equation between stress and time (see FIG. 1(b)) in the form of Expression (1) below; therefore, the correlation equation between stress and time in the form of the following Expression (1) is used as a stress-time curve formula (stress relaxation curve formula):

$$\sigma(t) = \Sigma E_i \exp(-t/\tau_i) \quad (1)$$

where $\sigma$ is stress, t is time, E is a tensile modulus of the elastic element in the generalized Maxwell model, and $\tau$ is a relaxation time.

DISCLOSURE OF THE INVENTION

Problems to be Solved by the Invention

In recent years, however, with increasing quality and added value of an elastic material (for example, adhesive), it has been found that the viscoelasticity alone cannot provide adequate evaluation of the property of the elastic material. Specifically, for evaluating the property of an elastic material that is nonlinear and undergoes large deformation, rubber elasticity needs to be included in the indicator in addition to the viscoelasticity.

However, in the generalized Maxwell model, which still allows a correlation equation between stress and strain in the form of Expression (2) below to be derived as a correlation equation for rubber elasticity from the Expression (1), the correlation equation between stress and strain (see FIG. 1(d)) in the form of the following Expression (2) cannot represent an actual stress-strain curve (see FIG. 1(c)), which is the rubber elasticity of the elastic material:

$$\dot{\sigma} = \sum_i E_i \dot{\varepsilon} - \sum_i \frac{\sigma_i}{\tau_i} \quad (2)$$

where $\eta$ is a viscosity modulus of a viscous element in the generalized Maxwell model, and $\varepsilon$ is strain.

Therefore, the present invention is achieved in view of the above-described problem, and it is an object thereof to provide a tool that can extend a viscoelastic model, or a generalized Maxwell model, create and formulate a model that can evaluate properties of both viscoelasticity and rubber elasticity (hereinafter referred to as "generalized Maxwell extension model"), and then use the model.

Means for Solving Problems

To achieve the above-described object, a program as a tool according to the present invention is a program for outputting, as a stress-strain curve formula, a correlation equation between stress and strain that is calculated from: a correlation equation between stress, strain, elastic modulus and relaxation time, calculated based on a Maxwell model in which an elastic element and a viscous element are placed in series; and a correlation equation between strain and elastic modulus, including different moduli depending on properties, the correlation equation between stress and strain including different moduli depending on the properties as parameters, characterized in that a computer is functioned as input means for inputting the parameters, identification means for identifying the correlation equation between stress and strain by the input parameters, and output means for outputting the identified correlation equation between stress and strain as the stress-strain curve formula.

With such a configuration, input of the different parameters depending on properties (including other parameters as required) yields output of the stress-strain curve formula depending on the property of the elastic material. For example, it is expected to realize an application program that, by inputting appropriately-changed parameters, pursues a desired stress-strain curve formula and performs material design accordingly.

In the program according to the present invention, by way of example, the correlation equation between strain and elastic modulus represents the elastic modulus in terms of an exponential function of strain, and the parameters include a first parameter by which the exponential function is multiplied and a second parameter by which strain is multiplied in an index.

In this case, further by way of example, the correlation equation between stress and strain is specified by the following formula when a Cauchy stress tensor is denoted by bold $\sigma$, a Jaumann rate is denoted by a right subscript (J), an elastic modulus is denoted by G, a strain rate tensor is denoted by bold D, the first parameter is denoted by A, the second parameter is denoted by B, a scalar of strain is denoted by $\varepsilon$ with hat, a deviation stress tensor of an elastic element is denoted by bold $\sigma'$, a relaxation time is denoted by $\tau$, pressure when a target is a compressible linear elastic body is denoted by p, a bulk modulus is denoted by $K_v$, an operator trace is denoted by tr, and a unit tensor is denoted by bold I:

$$\left(\frac{D\sigma}{Dt}\right)_{(J)} = $$

$$\sum_K \left(2G^K D + B^K \frac{D\hat{\varepsilon}}{Dt}\sigma'^K - \frac{\sigma'^K}{\tau^K}\right) - \left(p\frac{D\hat{\varepsilon}}{Dt}\frac{\sum_K B^K G^K}{\sum_K G^K} - K_v trD\right)I$$

$$G^K = A^K \exp(B^K \hat{\varepsilon})$$

To achieve the above-described object, an apparatus as a tool according to the present invention is an apparatus for outputting, as a stress-strain curve formula, a correlation equation between stress and strain that is calculated from: a correlation equation between stress, strain, elastic modulus and relaxation time, calculated based on a Maxwell model in which an elastic element and a viscous element are placed in series; and a correlation equation between strain and elastic modulus, including different moduli depending on properties, the correlation equation between stress and strain including different moduli depending on the properties as parameters, characterized in that the apparatus includes input means for inputting the parameters, identification means for identifying the correlation equation between stress and strain by the input parameters, and output means for outputting the identified correlation equation between stress and strain as the stress-strain curve formula.

Advantages of the Invention

As described above, according to the present invention, a tool can be provided that can extend a viscoelastic model, or a generalized Maxwell model, create and formulate a generalized Maxwell extension model that can evaluate properties of both viscoelasticity and rubber elasticity, and then use the model. Also, with the tool, a large deformation behavior of an elastic material having properties of both rubber elasticity and viscoelasticity can be expressed with high quantitative characteristics on simulation.

DETAILED DESCRIPTION OF THE PREFERRED EMBODIMENT

Figure 1A:
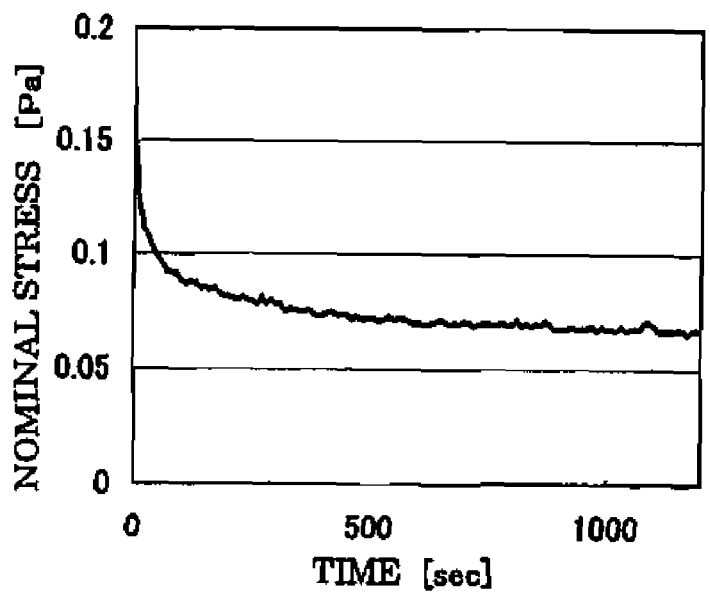
FIG. 1(a) is a view of an actual stress-time curve.
Figure 1B:
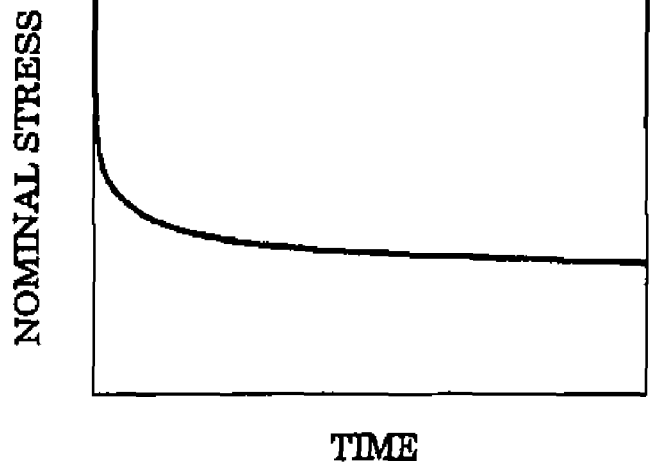
FIG. 1(b) is a view of a stress-time curve expressed by a calculated solution based on a generalized Maxwell model.
Figure 1C:
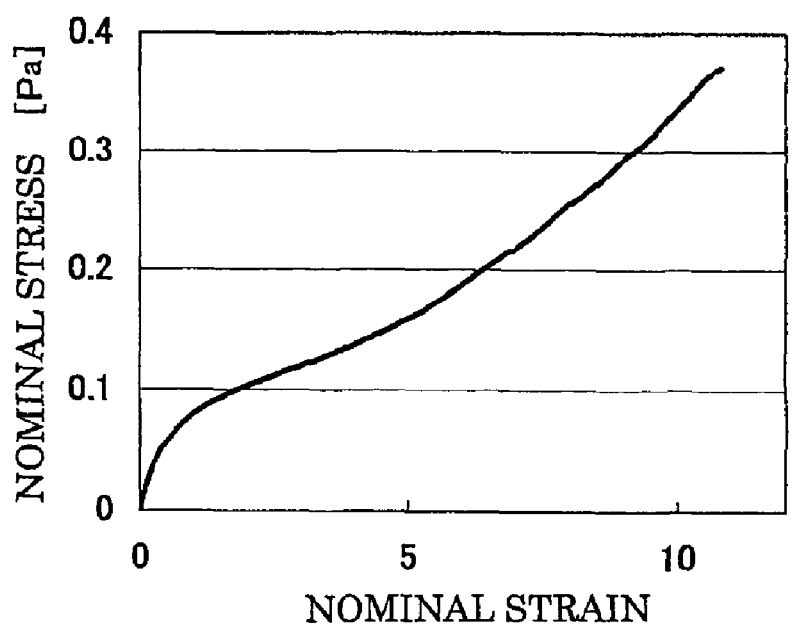
FIG. 1(c) is a view of an actual stress-strain curve.
Figure 1D:
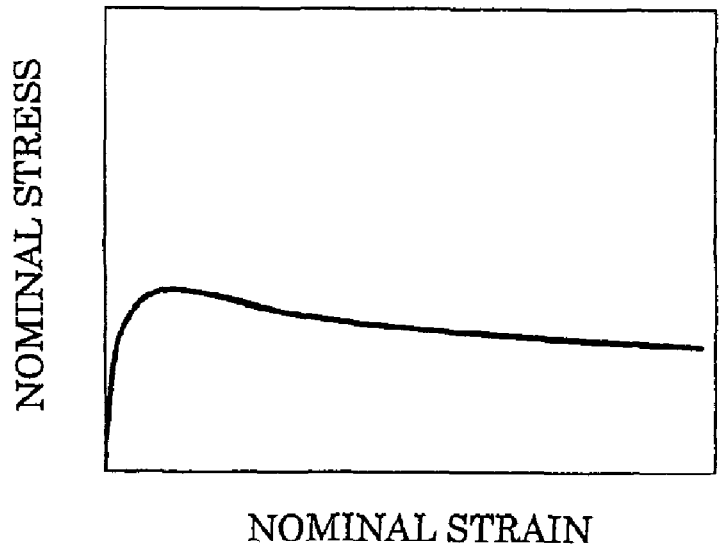
FIG. 1(d) is a view of a stress-strain curve expressed by a calculated solution based on the generalized Maxwell model.

Now, an embodiment of the present invention will be described with reference to the drawings.

This embodiment refers to a program for outputting, as a stress-strain curve formula, a correlation equation between stress and strain that is calculated from: a correlation equation between stress, strain, elastic modulus and relaxation time calculated based on a Maxwell model in which an elastic element and a viscous element are placed in series; and a correlation equation between strain and elastic modulus including different moduli depending on properties, the correlation equation between stress and strain including different moduli depending on the properties as parameters. A flow up to deriving the correlation equation between stress and strain will be described below.

The generalized Maxwell model expressed by the Expression (1) cannot represent rubber elasticity as described above. Thus, to represent the rubber elasticity as well, the inventors assumed a model (generalized Maxwell extension model) in which a tensile modulus E of an elastic element in the generalized Maxwell model (and a viscosity modulus η of the viscous element in the generalized Maxwell model) is used as a function of strain (see FIG. 2). A relaxation time $\tau(=\eta(\epsilon)/E(\epsilon))$ is considered constant for convenience.

Then, a regression analysis of the Expression (1) that represents viscoelasticity was first performed from measured values of a stress relaxation test, and pairs of the elastic modulus E and the relaxation time τ for each strain were calculated. More specifically, a cylindrical test piece having a sectional area of 2 mm$^2$ was prepared from an adhesive sheet, which was formed of acrylic polymer shaped into a sheet, and stretched with a space between chucks of 10 mm and at a speed of 1000 mm/min to obtain predetermined strain, then the strain was held in a constant state, a stress relaxation test was performed, a regression analysis was performed using the Expression (1), and a total of five pairs of elastic modulus E and relaxation time τ for each strain was calculated. The results thereof will be shown in Table 1 below.

TABLE 1

| τ [sec] | strain | | | | | |
|---|---|---|---|---|---|---|
| | 0.6931 | 1.0986 | 1.3863 | 1.6094 | 1.7918 | 1.9459 |
| | Ei [MPa] | | | | | |
| 1.00E+00 | 0.1541 | 0.3637 | 0.5694 | 1.2057 | 2.0546 | 3.8663 |
| 1.00E+01 | 0.0326 | 0.0832 | 0.1368 | 0.3548 | 0.5107 | 0.7711 |
| 1.00E+02 | 0.0363 | 0.0665 | 0.1237 | 0.1808 | 0.2708 | 0.3701 |
| 1.00E+03 | 0.0250 | 0.0519 | 0.0761 | 0.1040 | 0.1549 | 0.1522 |
| 1.00E+10 | 0.0639 | 0.1326 | 0.2150 | 0.3279 | 0.4608 | 0.5936 |

In Table 1, strain values are represented in logarithmic strain. In terms of nominal strain, the values are 100%, 200%, 300%, 400%, 500%, and 600% from the left.

Next, strain dependence data of the elastic modulus E was plotted and curve fitting was performed; it was found that, from approximation using an exponential function in the Expression (3) below, the elastic modulus had a high correlation coefficient ($R^2$ value in Table 2 closer to 1.000 indicates higher approximation) with respect to strain as indicated in Table 2 below. Specifically, it was confirmed that the following Expression (3) representing the elastic modulus E in terms of an exponential function of the strain ε was appropriate as the correlation equation between strain and elastic modulus:

TABLE 2

| τi | Ai | Bi | correlation coefficient |
|---|---|---|---|
| 1.00E+00 | 2.308E−02 | 2.510 | 0.9766 |
| 1.00E+01 | 5.032E−03 | 2.567 | 0.9875 |
| 1.00E+02 | 9.237E−03 | 1.874 | 0.9959 |
| 1.00E+03 | 9.468E−03 | 1.494 | 0.9843 |
| 1.00E+10 | 1.849E+00 | 1.786 | 0.9998 |

$$E_i = A_i \exp(B_i \epsilon) \qquad (3)$$

where A is a first parameter by which the exponential function is multiplied, and B is a second parameter by which the strain ε is multiplied in an index.

Thus, property values to be obtained are τi and Ei in the generalized Maxwell model (see the Expression (1)), while property values to be obtained are τi, Ai and Bi in the generalized Maxwell extension model.

Figure 3:
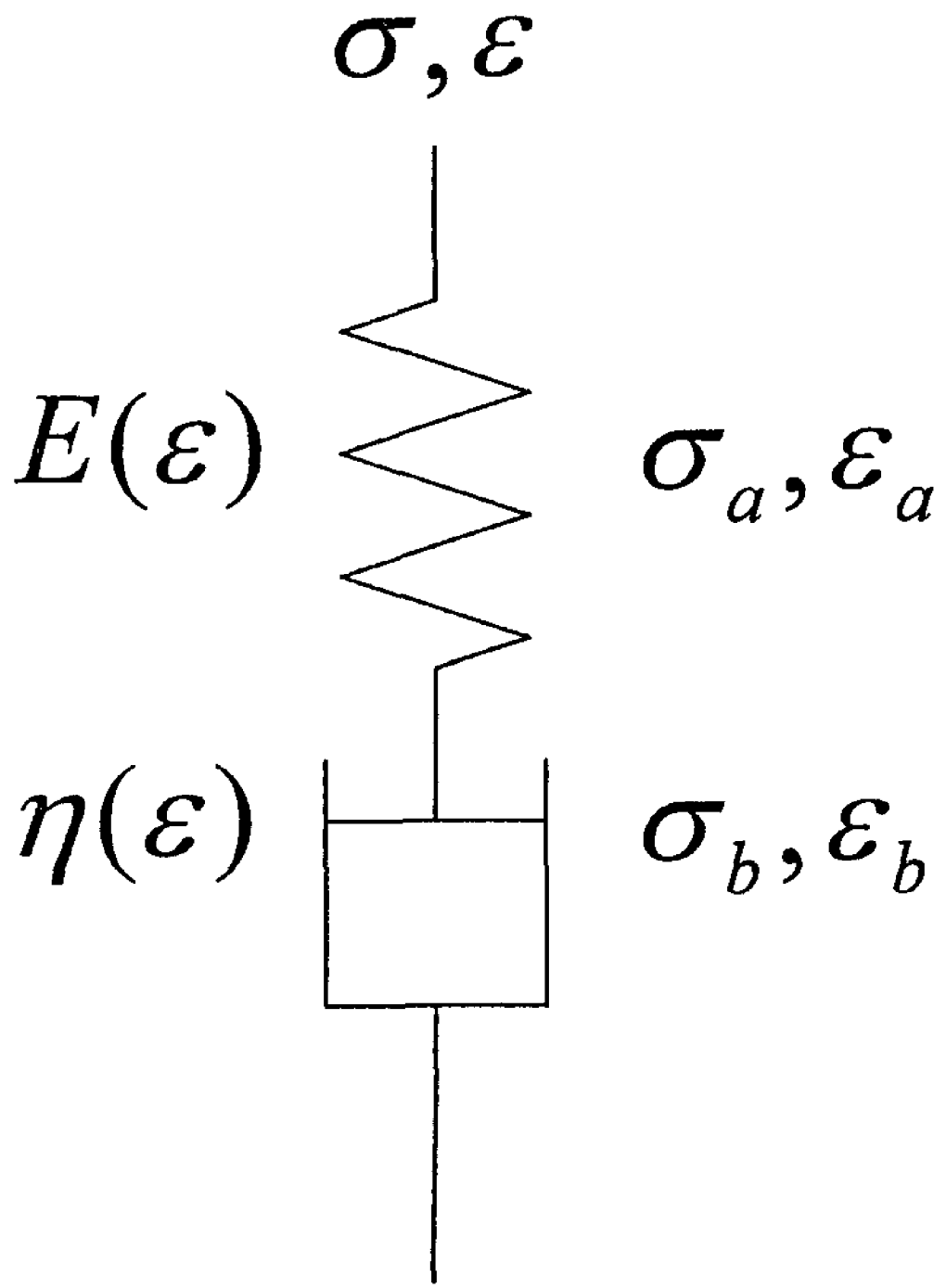
FIG. 3 is a conceptual view of one element model.

Next, a case with only one Maxwell element will be considered. As shown in FIG. 3, when stress is σ, strain is ε, an elastic modulus of the elastic element is E, and a viscosity modulus of the viscous element is η, $$\sigma = \sigma_a = \sigma_b \qquad (4)$$

$$\varepsilon = \varepsilon_a + \varepsilon_b \qquad (5)$$

$$\sigma_a = E(\varepsilon)\varepsilon_a \qquad (6)$$

$$\sigma_b = \eta \frac{d\varepsilon_b}{dt} \qquad (7)$$

When the Expression (6) is differentiated by time, the following Expression (8) is obtained:

$$\frac{d\sigma_a}{dt} = \varepsilon_a \frac{dE(\varepsilon)}{dt} + E(\varepsilon)\frac{d\varepsilon_a}{dt} \qquad (8)$$

Also, using a mathematical expression from the Expression (5) differentiated by time, the Expression (7), and the Expression (8) to eliminate $\varepsilon_a$ and $\varepsilon_b$ and rearranging the expressions, the following Expression (9) can be obtained:

$$\tau \cdot E(\varepsilon)\frac{d\varepsilon}{dt} = \tau \frac{d\sigma}{dt} + \left(1 - \frac{\tau}{E(\varepsilon)}\frac{dE(\varepsilon)}{dt}\right)\sigma \qquad (9)$$

When A and B are constants in the Expression (3), and the expression is rearranged with $$E(\varepsilon) = A\exp(B\cdot\varepsilon)$$

the following Expression (10) can be obtained.

$$\frac{d\sigma}{dt} = A\exp(B\varepsilon)\cdot\frac{d\varepsilon}{dt} - \left(\frac{1}{\tau} - B\frac{d\varepsilon}{dt}\right)\sigma \qquad (10)$$

This is a constitutive equation of one element model shown in FIG. 3.

Figure 2:
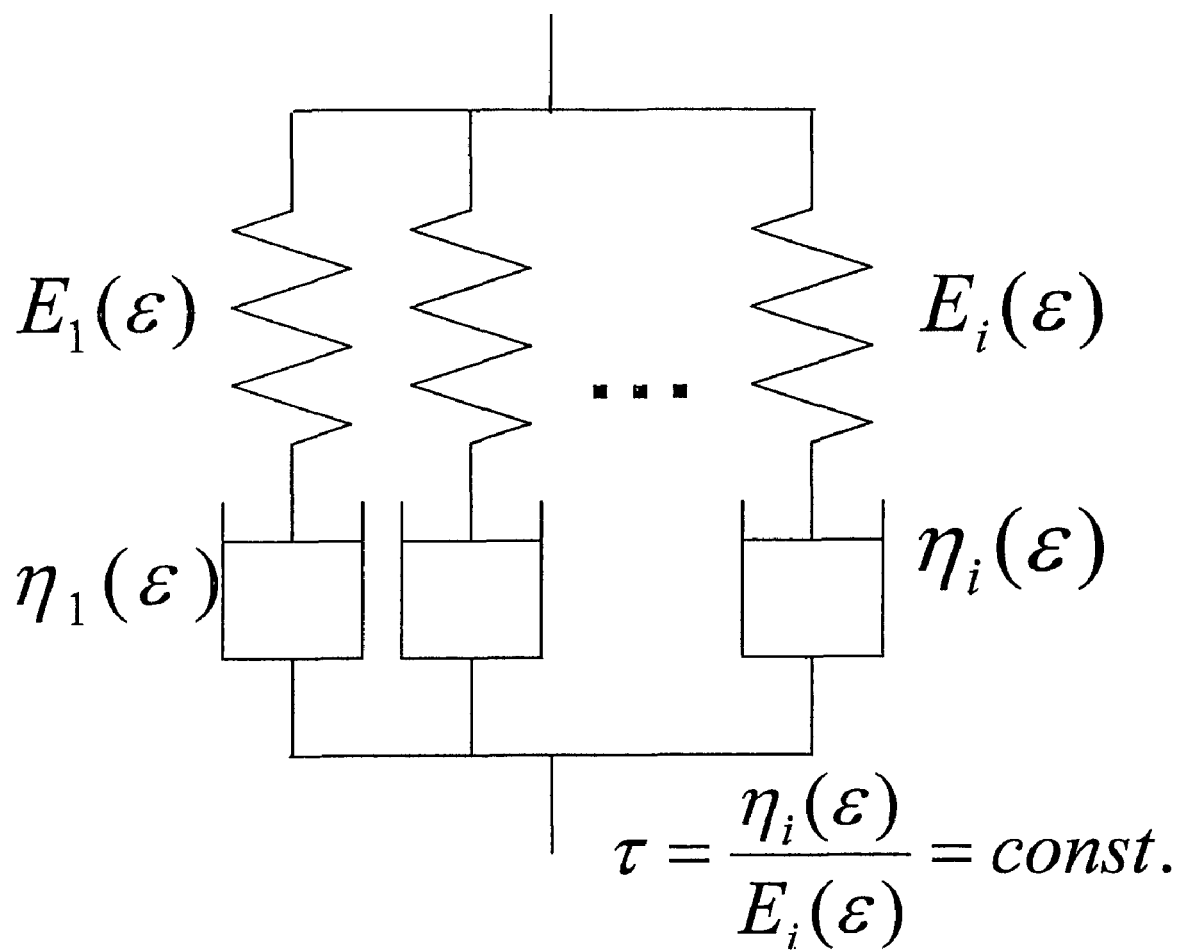
FIG. 2 is a conceptual view of a generalized Maxwell extension model.

Next, a general constitutive equation as shown in FIG. 2 will be derived. Also for a general constitutive equation, the Expression (10) is satisfied in each element, and therefore the following Expression (11) is satisfied:

$$\frac{d\sigma_i}{dt} = A_i\exp(B_i\varepsilon)\cdot\frac{d\varepsilon}{dt} - \left(\frac{1}{\tau_i} - B_i\frac{d\varepsilon}{dt}\right)\sigma_i \qquad (11)$$

In this model, strain of each element is constant, and therefore an index i is not added to the strain. Thus, since stress σ of the entire general model is the sum of $\sigma_i$ of the elements, the following Expression (12) is satisfied:

$$\frac{d\sigma}{dt} = \sum \frac{d\sigma_i}{dt}$$
$$= \sum A_i\exp(B_i\varepsilon)\cdot\frac{d\varepsilon}{dt} - \sum\left(\frac{1}{\tau_i} - B_i\frac{d\varepsilon}{dt}\right)\sigma_i \qquad (12)$$

and a correlation equation between stress and strain of the generalized Maxwell extension model can be obtained.

At this point, the Expression (12) is a mathematical expression for a one-dimensional mode and is considered to conceptually represent the correlation equation between stress and strain; for simulation purpose, however, it needs to be formulated for a three-dimensional mode. Thus, a flow up to deriving a mathematical expression in the three-dimensional mode will be described below.

Figure 4:
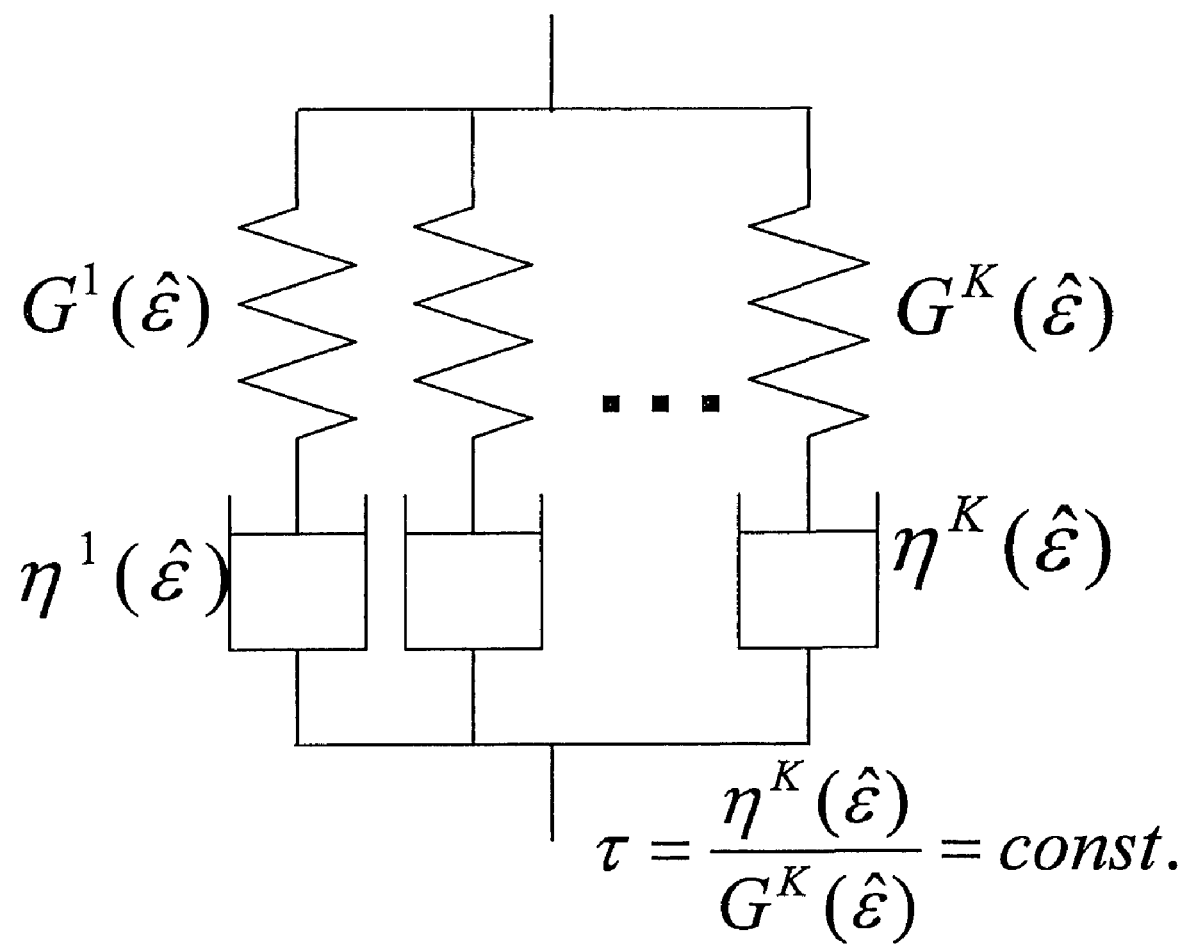
FIG. 4 is a conceptual view of the generalized Maxwell extension model in a three-dimensional mode.

First, as in the one-dimensional mode, when the generalized Maxwell extension model is set in three-dimensional terms as in FIG. 4, a correlation equation between strain and elastic modulus (including different moduli depending on properties of the elastic material) is expressed by the following Expression (13):

$$G^K = A^K\exp(B^K\hat{\varepsilon}) \qquad (13)$$

where G is a shear modulus, and ε with hat is a scalar of strain.

In the one-dimensional mode, the index i is indicated by a right subscript, while in the three-dimensional mode, an index K is indicated by a right superscript.

The scalar (ε with hat) of the strain is expressed with a micro-strain tensor (bold ε) as in the following Expression (14).

$$\hat{\varepsilon} = \sqrt{\frac{2}{3}\varepsilon:\varepsilon} \qquad (14)$$

A displacement stress tensor (bold σ') of an elastic element of a Kth unit is expressed by the following Expression (15):

$$\sigma'^K = 2G^K\varepsilon^{spK} \qquad (15)$$

where ε with an index spK is a micro-strain tensor of the elastic element of the Kth unit.

Material time differentiation of both sides of the Expression (15) is performed to obtain the following Expression (16):

$$\frac{D\sigma'^K}{Dt} = 2G^K D^{spK} + \frac{DG^K}{Dt}\frac{\sigma'^K}{G^K} \qquad (16)$$

where bold D is a strain rate tensor, and bold D with an index spK is a strain rate tensor of the elastic element of the Kth unit.

Since the left-hand side of the Expression (16) is a non-objective tensor, introducing an objective stress rate allows the following Expression (17) to be used as a constitutive equation of the elastic element:

$$\left(\frac{D\sigma'^K}{Dt}\right)_{(*)} = 2G^K D^{spK} + \frac{DG^K}{Dt}\frac{\sigma'^K}{G^K} \qquad (17)$$

where a right subscript (*) is any objective stress rate.

Meanwhile, a constitutive equation of a deviation component of the elastic element of the Kth unit is expressed by the following Expression (18).

$$\sigma'^K = 2\eta^K D^{dpK} \qquad (18)$$

When a micro-strain tensor of the entire system of the Kth unit is denoted by bold ε, and a micro-strain tensor of the Kth unit is denoted by bold ε with an index K, the following Expression (19) is obtained:

$$\varepsilon = \varepsilon^K = \varepsilon^{spK} + \varepsilon^{dpK} \qquad (19)$$

and material time differentiation of this expression is performed to obtain the following Expression (20).

$$D = D^{spK} + D^{dpK} \tag{20}$$

From the Expressions (17), (18) and (20), the constitutive equation of the deviation component of the Kth unit is derived as in the following Expression (21):

$$\left(\frac{D\sigma'^K}{Dt}\right)_{(*)} = 2G^K D + \frac{DG^K}{Dt}\frac{\sigma'^K}{G^K} - \frac{\sigma'^K}{\tau^K} \tag{21}$$

The Expression 1id) is expressed as in the following Expression (22):

$$\frac{DG^K}{Dt} = B^K G^K \frac{D\hat{\varepsilon}}{Dt} \tag{22}$$

and the Expression (21) is expressed as in the following Expression (23):

$$\left(\frac{D\sigma'^K}{Dt}\right)_{(*)} = 2G^K D + B^K \frac{D\hat{\varepsilon}}{Dt}\sigma'^K - \frac{\sigma'^K}{\tau^K} \tag{23}$$

From the property of the model, stress of the entire model is the sum of stress of K units, and thus stress of the deviation component is expressed by the following Expression (24):

$$\left(\frac{D\sigma'}{Dt}\right)_{(*)} = \sum_K \left(2G^K D + B^K \frac{D\hat{\varepsilon}}{Dt}\sigma'^K - \frac{\sigma'^K}{\tau^K}\right) \tag{24}$$

Next, a volume component will be considered. When a target is assumed to be a compressible linear elastic body, pressure p is expressed by the following Expression (25):

$$p = -K_v tr\varepsilon \tag{25}$$

where $K_v$ is a bulk modulus and tr is an operator trace, and the bulk modulus $K_v$ is expressed by the following Expression (26):

$$K_v = \frac{\sum_K E^K}{3(1-2v)} \tag{26}$$

where v is a Poisson's ratio.

Material time differentiation of the Expression (25) is performed to obtain the following Expression (27):

$$\frac{Dp}{Dt} = \frac{DK_v}{Dt}\frac{p}{K_v} - K_v trD \tag{27}$$

The following Expression (28) is also obtained:

$$\frac{DK_v}{Dt} = \frac{2(1+v)}{3(1-2v)}\sum_K \frac{DG^K}{Dt} \tag{28}$$

and the Expression (22) is further assigned to obtain the following Expression (29):

$$\frac{DK_v}{Dt} = \frac{2(1+v)}{3(1-2v)}\sum_K B^K G^K \frac{D\hat{\varepsilon}}{Dt} \tag{29}$$

Thus, a constitutive equation of the volume component is expressed by the following Expression (30):

$$\frac{Dp}{Dt} = p\frac{D\hat{\varepsilon}}{Dt}\frac{\sum_K B^K G^K}{\sum_K G^K} - K_v trD \tag{30}$$

Considering the use of a Jaumann rate as an objective stress rate, a relationship represented by the following Expression (31) is satisfied between a material time derivative of the Cauchy stress (bold σ) and the Jaumann rate:

$$\left(\frac{D\sigma}{Dt}\right)_{(J)} = \frac{D\sigma}{Dt} + \sigma \cdot W - W \cdot \sigma \tag{31}$$

where bold W is a spin tensor and a right subscript (J) is the Jaumann rate.

The Cauchy stress (bold σ) is separated into a deviation component and a volume component to obtain the following Expression (32):

$$\sigma = \sigma' - pI \tag{32}$$

Specifically, the first term on the right-hand side denotes the deviation component, and the second term denotes the volume component. The letter I denotes a unit tensor.

The Expression (32) is assigned to the right-hand side of the Expression (31) to obtain the following Expression (33):

$$\left(\frac{D\sigma}{Dt}\right)_{(J)} = \frac{D\sigma'}{Dt} - \frac{Dp}{Dt}I + (\sigma' - pI) \cdot W - W \cdot (\sigma' - pI) \tag{33}$$

$$= \left(\frac{D\sigma'}{Dt}\right)_{(J)} - \frac{Dp}{Dt}I$$

Thus, for a constitutive equation of the all components when the Jaumann rate is used as the objective stress rate, the following Expression (34) is satisfied from the constitutive equation of the deviation component (the Expression (24)) and the constitutive equation of the volume component (the Expression (30)):

$$\left(\frac{D\sigma}{Dt}\right)_{(J)} = \tag{34}$$

$$\sum_K \left(2G^K D + B^K \frac{D\hat{\varepsilon}}{Dt}\sigma'^K - \frac{\sigma'^K}{\tau^K}\right) - \left(p\frac{D\hat{\varepsilon}}{Dt}\frac{\sum_K B^K G^K}{\sum_K G^K} - K_v trD\right)I$$

and thus, the correlation equation between stress and strain in the three-dimensional mode of the generalized Maxwell extension model can be obtained.

The Expression (34) was verified as described below. First, a cylindrical test piece having a sectional area of 2 mm² was prepared from an adhesive sheet, which was formed of acrylic polymer shaped into a sheet, and stress-strain measurement was performed under three conditions with a space between chucks of 10 mm and at tensile speeds of 5, 50 and 500 mm/min. A one-dimensional mode expression of the Expression (34) was the following Expression (35) (see the Expression (12)):

$$\frac{d\sigma}{dt} = \sum_K \frac{d\sigma^K}{dt} \quad (35)$$

$$= \sum_K \exp(B^K \varepsilon) \cdot \frac{d\varepsilon}{dt} A^K - \sum_K \left(\frac{1}{\tau^K} - B^K \frac{d\varepsilon}{dt}\right) \sigma^K$$

and the Expression (35) was used to determine $A^K$, $B^K$ and $\tau^K$ by a nonlinear least squares method.

Figure 5:
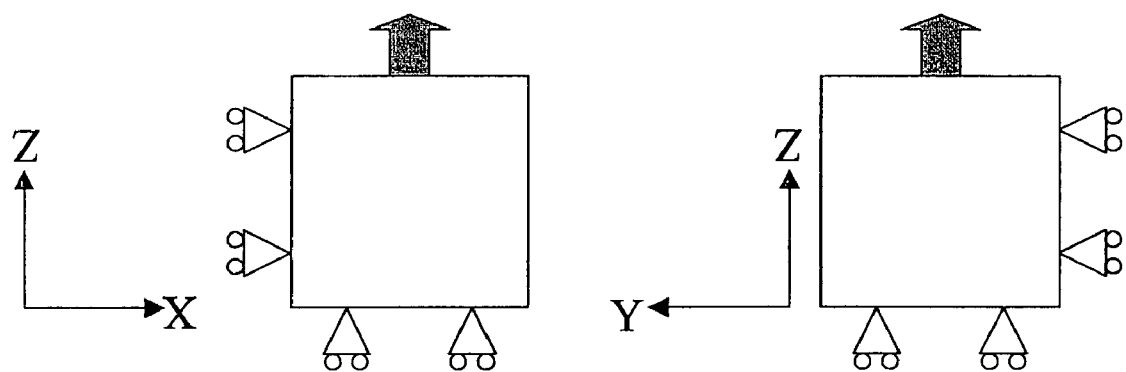
FIG. 5 is a conceptual view of one element analysis model for verifying the generalized Maxwell extension model.

Then, for verifying the validity of the model, the Lagrange solution was used to review the model. An analysis model was a cube 10 mm on one side. An actual adhesive has a Poisson's ratio close to incompressibility; with a Poisson's ratio of 0.49 or the like, however, a phenomenon that appears to be locking occurs to prevent progress of the analysis. Even if an element division number is increased, the analysis also does not progress. Thus, first, to verify the validity of the model, an analysis model with one element at a Poisson's ratio of 0.3 as in FIG. 5 was set, and a verification experiment was performed.

Figure 6:
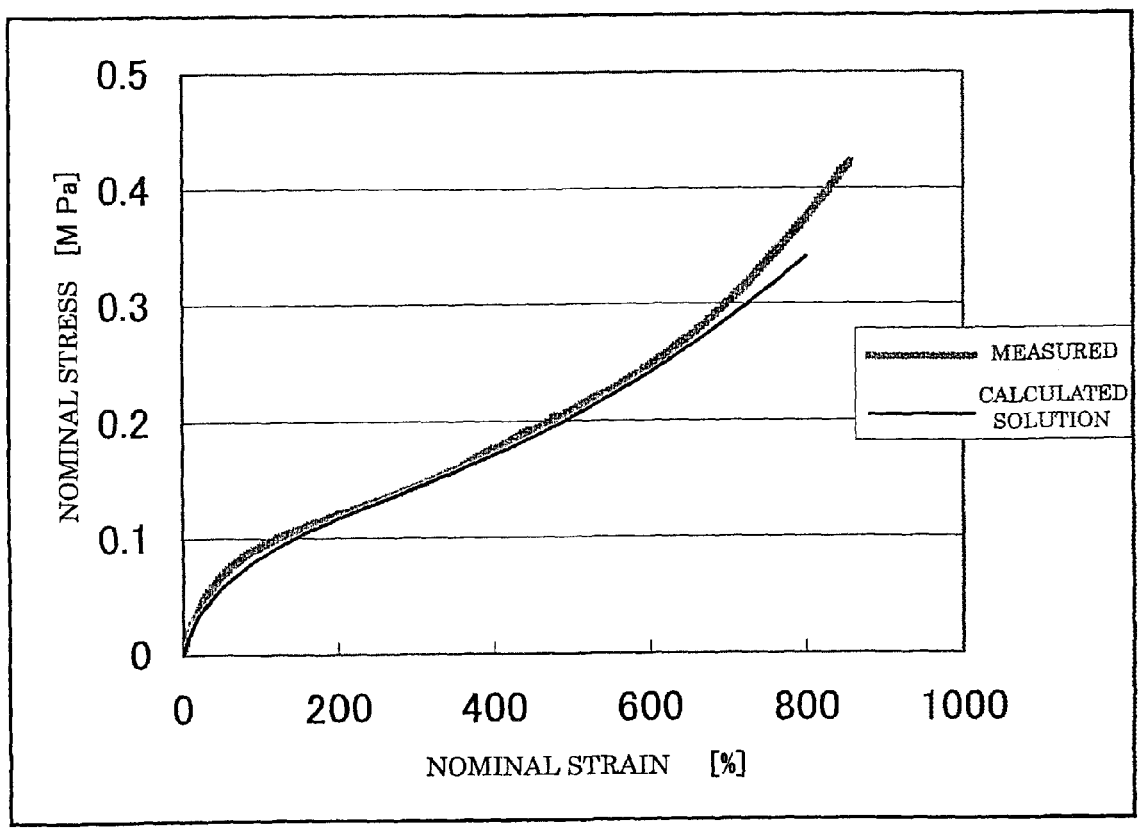
FIG. 6 is a view of an actual stress-strain curve measured at a tensile speed of 50 mm/min, and a view of a stress-strain curve expressed by a calculated solution based on the generalized Maxwell extension model.

The result showed that a measured value and a simulation value have a good correlation as is apparent from Table 3 and FIG. 6 below.

TABLE 3

| Unit number | AK [Pa]  | BK   | τK [sec] |
|-------------|----------|------|----------|
| 1           | 1.28E+05 | 1.17 | 1.0E+00  |
| 2           | 8.93E+01 | 4.40 | 1.0E+01  |
| 3           | 3.71E+02 | 3.67 | 1.0E+02  |
| 4           | 1.30E+05 | 0.67 | 1.0E+03  |
| 5           | 7.13E+01 | 3.85 | 1.0E+06  |

As such, it was confirmed that the generalized Maxwell extension model was an appropriate model as a model for representing deformation of an adhesive (elastic material) having properties of rubber elasticity and viscoelasticity. From the above, by evaluating the viscoelasticity in the same way as the conventional method and evaluating the rubber elasticity with this proposed method, a large deformation behavior of an elastic material having properties of both rubber elasticity and viscoelasticity can be expressed with high quantitative characteristics on simulation.

Software according to this embodiment is a program for outputting, as a stress-strain curve formula, a correlation equation between stress and strain (the Expressions (12) and (35) in the one-dimensional mode and the Expression (34) in the three-dimensional mode) that is calculated from: a correlation equation between stress, strain, elastic modulus and relaxation time (the Expression (9) in the one-dimensional mode and the Expression (21) in the three-dimensional mode) calculated based on a Maxwell model in which an elastic element and a viscous element are placed in series; and a correlation equation between strain and elastic modulus (the Expression (3) in the one-dimensional mode and the Expression (13) in the three-dimensional mode) including different moduli depending on properties, the correlation equation between stress and strain including different moduli depending on the properties as parameters ($A_i$, $B_i$, and $\tau_i$ in the one-dimensional mode and $A^K$, $B^K$ and $\tau^K$ in the three-dimensional mode), wherein a computer is functioned as input means for inputting the parameters ($A_i$, $B_i$, and $\tau_i$ in the one-dimensional mode and $A^K$, $B^K$ and $\tau^K$ in the three-dimensional mode), identification means for identifying the correlation equation between stress and strain by the input parameters, and output means for outputting the identified correlation equation between stress and strain as the stress-strain curve formula. In the three-dimensional mode, parameters other than the parameters $A^K$, $B^K$ and $\tau_K$ in the Expression (34) can be input as required or stored in a storage portion (ROM or memory described later) of the computer.

The apparatus according to this embodiment is constituted by a computer, and includes a CPU, a ROM, a working memory, a frame memory, a data input/output device, a hard disk and a display all connected to a bus 7. The ROM stores the program or various parameters, and the working memory is a memory required for the CPU to perform control, and includes a buffer and a resister, or the like. The CPU performs various arithmetical operations and processing according to the computer program stored in the ROM. The data input/output device constitutes the input means, and a control portion including the CPU, the ROM and the memory constitute the identification means. For the output means, when the stress-strain curve expressed by the stress-strain curve formula is displayed on the display, the display constitutes the output means, when the stress-strain curve formula is transmitted to the outside, the input/output device constitutes the output means, and when the stress-strain curve formula is held in the control portion (such as a case where an application program using the formula is installed in the control portion and the application program is started in the personal computer), the control portion itself constitutes the output means.

In view of the fact that viscoelasticity is evaluated together, programs for the evaluation of viscoelasticity are preferably programmed and held in the apparatus (installed in the computer).

The present invention is not limited to the above-described embodiment, but various modifications may be made without departing from the gist of the present invention.

For example, the stress-strain curve formula and the various correlation equations as premises thereof are not limited to those described above, but may be various correlation equations based on other proper approximate expressions and a stress-strain curve formula derived from the expressions.

In the above embodiment, the tensile modulus E is used as the elastic modulus in the one-dimensional mode, and the shear modulus is used as the elastic modulus in the three-dimensional mode, but it may be conceivable that the shear modulus is used instead of the tensile modulus in the one-dimensional mode. In this case, E in each expression is replaced by G.

INDUSTRIAL APPLICABILITY

The present invention can be used for designing an elastic material having properties of both rubber elasticity and viscoelasticity and having high quality and added value.

The invention claimed is:

1. A method for causing a computer to execute a program for outputting, as a stress-strain curve formula, a correlation equation between stress and strain that is calculated from: a correlation equation between stress, strain, elastic modulus and relaxation time, calculated based on a Maxwell model in which an elastic element and a viscous element are placed in series; and a correlation equation between strain and elastic modulus, including different moduli depending on properties, the correlation equation between stress and strain including different moduli depending on said properties as parameters, said computer executing the steps comprising:

inputting said parameters;

identifying said correlation equation between stress and strain by said input parameters; and outputting said identified correlation equation between stress and strain as the stress-strain curve formula, wherein said correlation equation between strain and elastic modulus represents the elastic modulus in terms of an exponential function of strain, and said parameters include a first parameter by which the exponential function is multiplied and a second parameter by which strain is multiplied in an index, and wherein the correlation equation between stress and strain is specified by the following formula when a Cauchy stress tensor is denoted by bold σ, a Jaumann rate is denoted by a right subscript (J), an elastic modulus is denoted by G, a strain rate tensor is denoted by bold D, said first parameter is denoted by A, said second parameter is denoted by B, a scalar of strain is denoted by ε with hat, a deviation stress tensor of an elastic element is denoted by bold σ', a relaxation time is denoted by τ, pressure when a target is a compressible linear elastic body is denoted by p, a bulk modulus is denoted by $K_v$, an operator trace is denoted by tr, and a unit tensor is denoted by bold I, in a Kth unit:

$$\left(\frac{D\sigma}{Dt}\right)_{(J)} = \sum_K \left(2G^K D + B^K \frac{D\hat{\varepsilon}}{Dt}\sigma'^K - \frac{\sigma'^K}{\tau^K}\right) - \left(p\frac{D\hat{\varepsilon}}{Dt}\frac{\sum_K B^K G^K}{\sum_K G^K} - K_v trD\right)I$$

$$G^K = A^K \exp(B^K \hat{\varepsilon}).$$

2. An apparatus for outputting, as a stress-strain curve formula, a correlation equation between stress and strain that is calculated from: a correlation equation between stress, strain, elastic modulus and relaxation time, calculated based on a Maxwell model in which an elastic element and a viscous element are placed in series; and a correlation equation between strain and elastic modulus, including different moduli depending on properties, the correlation equation between stress and strain including different moduli depending on said properties as parameters, characterized in that the apparatus comprises:

input means for inputting said parameters;

identification means for identifying said correlation equation between stress and strain by said input parameters; and output means for outputting said identified correlation equation between stress and strain as the stress-strain curve formula, wherein said correlation equation between strain and elastic modulus represents the elastic modulus in terms of an exponential function of strain, and said parameters include a first parameter by which the exponential function is multiplied and a second parameter by which strain is multiplied in an index, wherein the correlation equation between stress and strain is specified by the following formula when a Cauchy stress tensor is denoted by bold σ, a Jaumann rate is denoted by a right subscript (J), an elastic modulus is denoted by G, a strain rate tensor is denoted by bold D, said first parameter is denoted by A, said second parameter is denoted by B, a scalar of strain is denoted by ε with hat, a deviation stress tensor of an elastic element is denoted by bold σ', a relaxation time is denoted by τ, pressure when a target is a compressible linear elastic body is denoted by p, a bulk modulus is denoted by $K_v$, an operator trace is denoted by tr, and a unit tensor is denoted by bold I, in a Kth unit:

$$\left(\frac{D\sigma}{Dt}\right)_{(J)} = \sum_K \left(2G^K D + B^K \frac{D\hat{\varepsilon}}{Dt}\sigma'^K - \frac{\sigma'^K}{\tau^K}\right) - \left(p\frac{D\hat{\varepsilon}}{Dt}\frac{\sum_K B^K G^K}{\sum_K G^K} - K_v trD\right)I$$

$$G^K = A^K \exp(B^K \hat{\varepsilon}).$$

* * * * *